Oct. 21, 1924.  1,512,821

J. E. CURTON

MOTOR PLOW

Filed June 23, 1923  3 Sheets-Sheet 1

Inventor
J. E. Curton
by Wilkinson &
Giusta
Attorneys.

Oct. 21, 1924.  
J. E. CURTON  
MOTOR PLOW  
Filed June 23, 1923  
1,512,821  
3 Sheets-Sheet 2
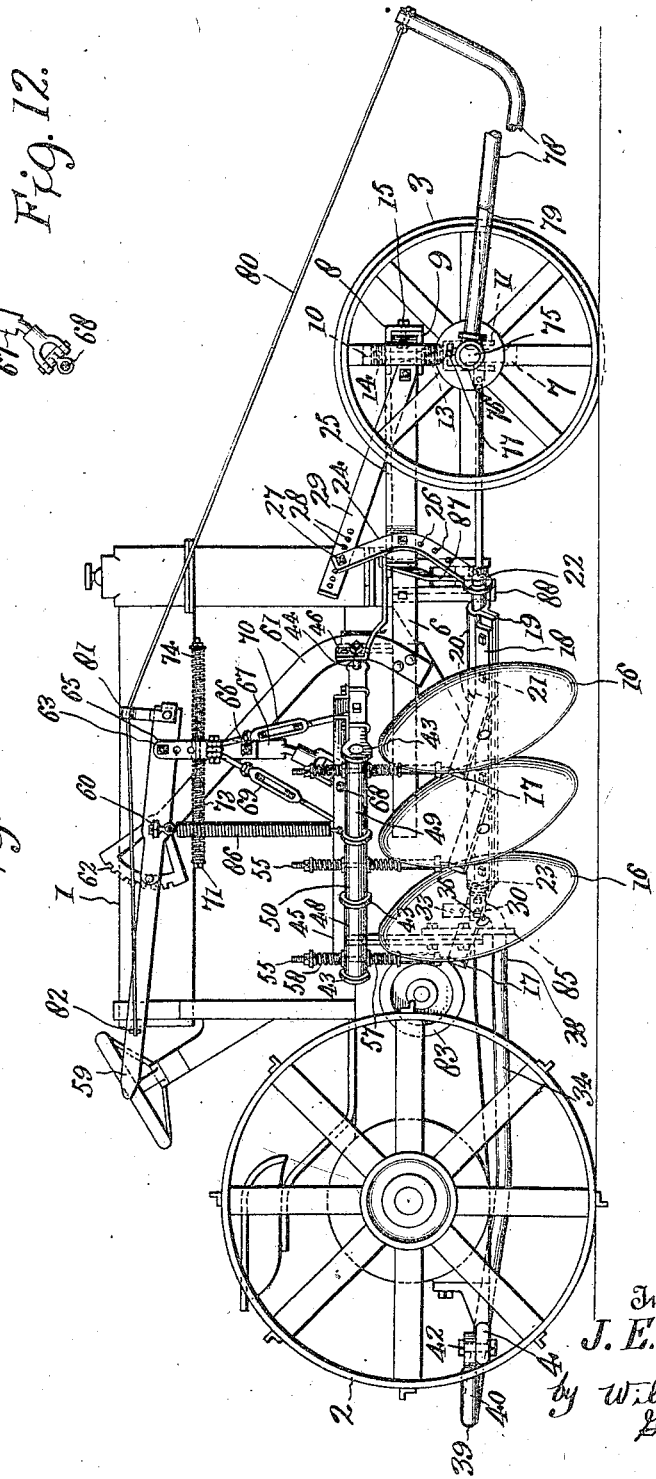
Inventor  
J. E. Curton  
by Wilkinson &  
Giusta  
Attorneys.

Oct. 21, 1924.
J. E. CURTON
MOTOR PLOW
Filed June 23, 1923    3 Sheets-Sheet 3
1,512,821
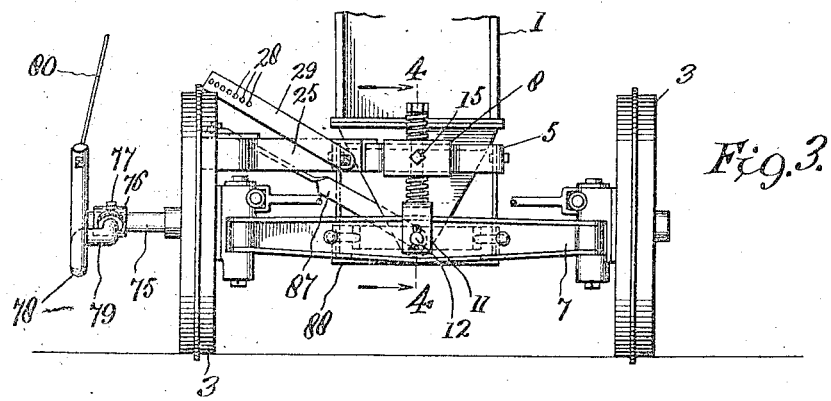
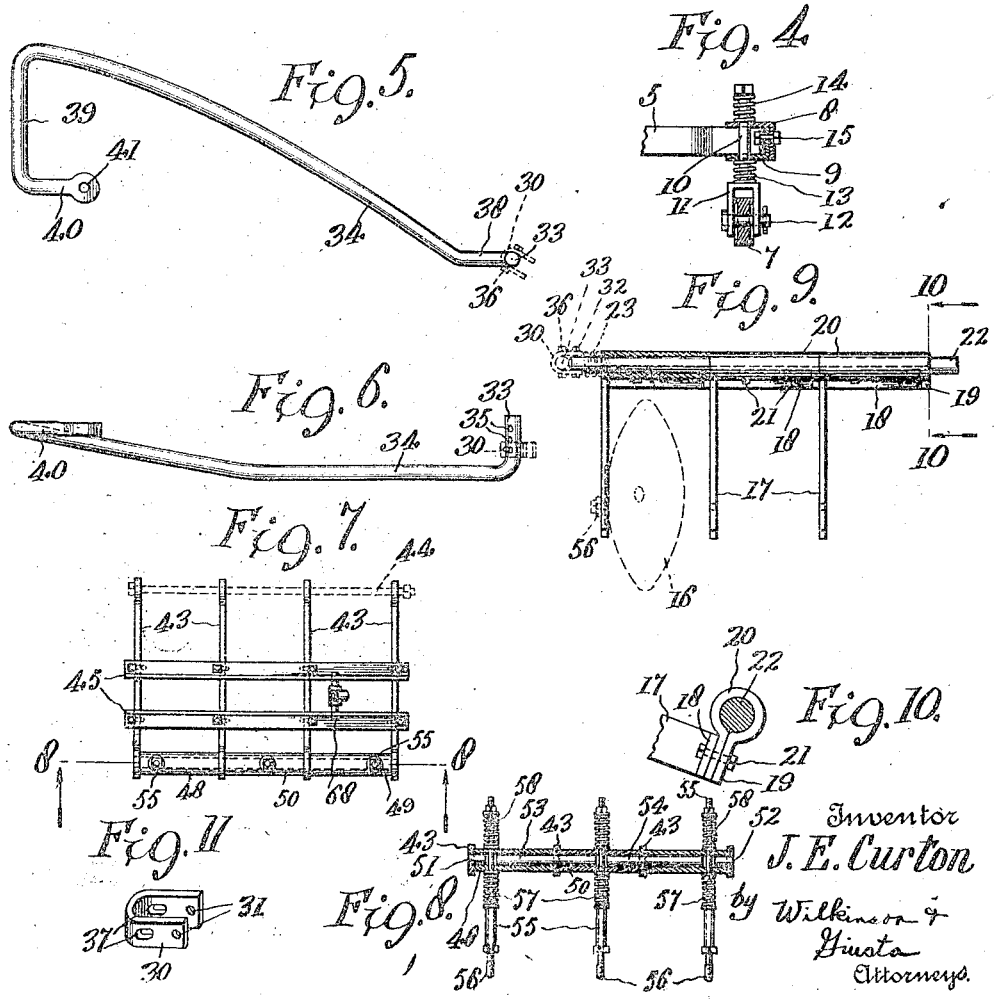

Patented Oct. 21, 1924.

1,512,821

UNITED STATES PATENT OFFICE.

JOSEPH E. CURTON, OF WACO, TEXAS.

MOTOR PLOW.

Application filed June 23, 1923. Serial No. 647,299.

*To all whom it may concern:*

Be it known that I, JOSEPH E. CURTON, a citizen of the United States, residing at Waco, in the county of McLennan and State of Texas, have invented certain new and useful Improvements in Motor Plows; and I do hereby declare the following to be a full, clear, and exact description of the invention, such as will enable others skilled in the art to which it appertains to make and use the same.

The present invention relates to improvements in motor plows and has for an object to provide an improved attachment for tractors in which a gang plow assembly is provided in a compact arrangement for convenience in mounting upon the tractor frame. Another object of the invention is to provide an improved mounting and connection for the plow assembly in which all side draft will be eliminated and in which provision is made for forming the new rows with relation to the last old furrow plowed.

The invention further contemplates certain improvements in the tractor structure in which the front wheels are moved forwardly, an extension frame being provided for this purpose; the combined revised tractor providing additional space between the tractor wheels for receiving the plow assembly.

A still further object of the invention consists in providing a shock absorber in connection with the front extension frame of the tractor and in the arrangement and disposition of the bracing and other constructional parts for coupling the plow assembly to the tractor frame.

With the foregoing and other objects in view the invention consists in the constructions, combinations and arrangement hereinafter more fully described and more particularly pointed out in the appended claims.

In the drawings wherein like reference symbols refer to like or corresponding parts throughout the several views,—

Figure 2 is a side view of the plows in the raised position.

Figure 3 is a fragmentary front view of the apparatus.

Figure 4 is a section taken on the line 4—4 in Figure 3.

Figure 5 is a plan view of a beam employed.

Fig. 6 is a side view of the same.

Figure 7 is a plan view of the upper plow frame.

Figure 8 is a section taken on the line 8—8 in Figure 7.

Figure 9 is a fragmentary plan view of the lower plow frame showing one of the plows in dotted lines.

Figure 10 is a section taken on the line 10—10 in Figure 9.

Figure 11 is a perspective view of the clevis employed.

Figure 12 is a fragmentary side view showing an automatic trip.

Figure 1:
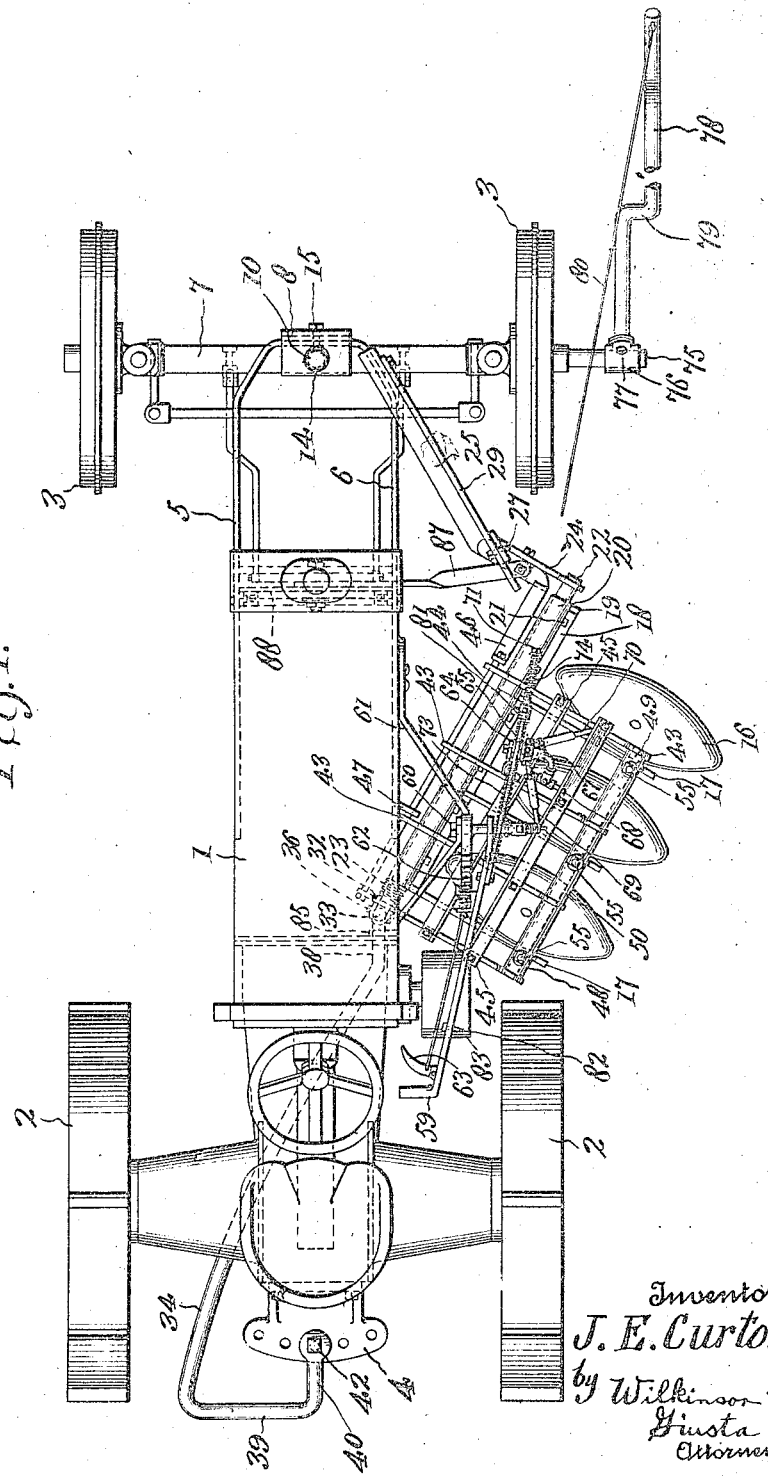
Figure 1 is a top plan view of an improved tractor and plow assembly constructed according to my invention.

Referring more particularly to the drawings 1 designates generally a tractor of conventional type and including the rear driving wheels 2 and the front steering wheels 3. The tractor is provided at its rear with the usual draw bar 4.

The gang plow assembly is disposed at the side of the tractor and between the front and rear wheels in the position substantially as shown in Figure 1; and for the purpose of providing ample space at the side and between the wheels to receive this gang plow arrangement, I prefer to modify the front construction of the tractor in order to advance the front steering wheels 3 considerably forward of the position they occupy in the standard construction.

To accomplish this result I utilize a bar having side portions 5 and 6 extending along the tractor frame and secured thereto, the intermediate portion of the bar extending forwardly of the tractor frame and providing a support for the front axle 7. In Figure 4 the front extended portion of the bar is provided with upper and lower angle irons 8 and 9 having the vertical flanges thereof overlapped, the horizontal flanges engaged above and below the bar and forming a suitable support for the vertically sliding bolt or pin 10. The pin 10 carries at its lower end a fork or yoke 11 straddling the front axle 7 and being pivotally secured thereto as by the pin 12. A coil spring 13 is wound about the pin 10 between the yoke 11 and the lower angle iron 9, this spring adapted to be compressed incident to shocks and jars encountered by the front wheels 3 in the course of travel of the machine. Between the upper angle iron 8 and the head of the pin 10 is a second coil spring 14 arranged to absorb the reactionary shocks and jars encountered when the body of the vehicle tends to assume its original position. The springs 13 and 14 are relatively compensating and they serve to modify the one or the other and to balance the front axle in connection with the extension frame.

Still referring to Figure 4 the vertical flanges of the angle irons 8 and 9 which overlap and are disposed against the extension frame bar are secured rigidly thereto as by the pin 15. This affords rigid abutments in the angle irons for the springs.

The plows are indicated at 16 and in the instance shown are disc plows, being three in number; it being understood however that any other type of plow can be used and the plows may be employed in various numbers.

Now as shown in Figure 9 these plows 16 are carried individually upon arms 17. Each arm is affixed to a sleeve in the manner shown in Figure 10, the arm having a flanged end 18 placed against one of the flanges 19 of the sleeve 20. The sleeve is a divided cylinder having at the split end thereof two wide flanges 19 brought together and secured by the bolts 21 which also pass through the flanged end 18 of the frame.

The sleeves 20 are mounted for rotary movement upon a shaft 22 which is mounted in appropriate bearings carried by the tractor frame. The sleeves 20 are held together against axial vibration by a coil spring 23 wound upon one end of the shaft 22. The shaft 22 is mounted at one end in the lower end of a curved arm 24 bolted at an intermediate point to an angle iron 25 projecting diagonally from the front portion of the extension frame. The curved arm 24 is provided with a series of perforations 26 in order to admit of adjustment to raise and lower the plows. The upper end of the curved arm 24 is adjustably secured by means of a bolt 27 in one of a row perforations 28 carried by a diagonally extending brace 29 which overlies the angle iron 25.

The rear end of the shaft 22 is secured in a clevis 30 shown more particularly in Figure 11. The clevis is pinned to the rear end of the shaft 22 and for this purpose is provided with perforations 31 to receive the pin 32 shown in Figure 9. The clevis embraces the upwardly turned end 33 of a beam 34. This upwardly turned end is provided with perforations 35 to receive the clevis bolt 36 which passes through the slots 37 in the clevis 30. The beam 34 is more particularly shown in Figures 5 and 6 and it consists of a major intermediate portion which is slightly curved and extends in a general diagonal direction across the longitudinal center line of the tractor. The forward end portion 38 is disposed at a slight angle with respect to the diagonal major portion in order to bring the end substantially parallel with the line of draft. The rear end of the beam is bent toward the center line of draft to provide the transverse portion 39 and the terminal end 40 of the beam is bent forwardly and provided with an eye 41 to receive the pin 42 carried by the tractor draw bar 4.

Now the plow assembly further involves an upper frame pivotally supported and connected with the plows or with the arms 17. The upper frame is shown in Figures 7 and 8 and comprises a number of arms 43 pivoted upon a bolt 44 and secured in spaced relation by the use of a number of braces 45. The frame is suspended through the shaft 44 which is mounted for rotation at its forward end in a bracket 46 carried by the rear end of the angle iron 25. The shaft is also supported at a second point of suspension by a strap 47 which extends upwardly from the side piece 6.

The forward end of this upper frame is made up of two end sleeves 48 and 49 and an intermediate sleeve 50. These sleeves are carried upon the outer ends of the arms 43. Within the sleeves are four shafts comprising two end shafts 51 and 52 and two intermediate 53 and 54. The shafts are spaced apart from one another to receive the rods 55, the lower ends of which are provided with eyes 56 secured to the arms 17. The rods 55 are provided with coil springs 57 and 58 above and below the sleeves for the purpose of cushioning individually the disc plows and for yieldably holding the plows to the soil.

The upper springs 56 cushion the plows and ease the movement of the tractor so that the tractor can run at highest speed in high gear. The plow assembly is raised and lowered by the use of a lever 59 pivoted at 60 upon an arm 61 having a latched segment 62 thereon cooperating with the latch 63 of the lever. The rear end portion of the lever is pivoted at 63 to two bars 64 and 65. These bars depend from the lever and are both pivoted as shown at 66 in Figure 12 to a perforated link 67 which is swivelly attached to the hinged plow frame at a point designated at 68.

The outer bar 65 is coupled to a pair of links 69 and 70 which extend downwardly and in divergent relation as indicated in Figures 1 and 2, the lower ends of these links being coupled to the hinged frame of the plow. These links 69 and 70 are fastened to the arms 43 of the upper plow frame. A rod 71 extends through an eye 72 upon the upper end of the link 67, and coil springs 73 and 74 are wound upon the rod 71. The coil spring 73 has one end engaged against the head of the rod and its other end engaged against the bars 64 and 65; while the companion spring 74 abuts against the eye 72 at one end and the other end of the rod 71 at its other end.

Should one of the plows encounter an obstruction such as to lift the frame, the link 67 will pivot about the point 66 compressing the spring 73 and 74. This will allow a movement of the frame in case of emergency without affecting the locking condition of the lever 59 and the springs will restore the frame to the lower position after the obstruction is passed.

The front wheel is provided with an extension 75 at one side adapted to adjustably receive a sleeve 76 provided with a set screw 77 for fixing the adjustment. The sleeve carries a rod 78 formed with a downwardly and upturned end in the shape of a shoe adapted to fit in and slide in the adjacent furrow. There is also an outwardly off set portion 79 in the rod. The upturned end of the shoe receives a cord or flexible connection 80 extending through a guide 81 carried by the forward end of the lever 59 and the connection is carried to a rear point near the handle of the lever 59 to which it is affixed as indicated at 82. The movement of the lever 59 will thus be communicated to the furrow shoe.

For instance when the lever 59 is swung down, the connection 80 will lift the shoe out of the furrow. When on the other hand the lever is lifted causing the plows to enter the soil, the shoe will also be allowed to descend into the furrow. The shoe acts to guide the movement of the tractor in forming the new furrows. It also acts as a gage to enable the plows to take more or less ground.

It will be appreciated that the driver of the tractor occupies a convenient position for manipulating the lever 59 and that by swinging this lever up or down the plows may be made to descend more or less into the soil or may be lifted entirely therefrom. The position of the lever may be secured by the latch arrangement and the movement of the lever also affects the position of the gage or furrow shoe. During the ordinary progress of plowing, the various plows are apt to individually encounter stones or other obstructions and the arrangement is such that these plows may independently yield upwardly to allow of the passing over of such obstructions without injury to the plow or its associated parts. Moreover the plow frame as a whole may be elevated automatically and both the plows and the entire frame are restored automatically to the proper plowing position once the obstruction is passed over.

In tractors a power take-off shaft is provided for the mounting of a pulley 83. It is essential that this be not interfered with and as shown the plows are well forward of the pulley and the extension frame provides adequate room for both.

The arrangement of the beam 34 provides for the elimination of side draft and this beam acts as an equalizer for permitting to the plows a direct draft and a forward thrust which contributes to the effective turning of the soil. The rear end of the beam 34 is connected above the draw bar as shown in Figure 2 and the major portion is bent downwardly below the draw bar with the forward end of the beam coming up through the clevis. With this arrangement as the load is encountered the weight of the load devolves upon the bar causing the bar to draw the rear tractor more firmly against the ground so that the greater the load the firmer will the wheels be held to the ground and the better the traction.

The beam 34 when in its forward end is secured in the bracket 85 which depends from the tractor or from a suitable part of the frame work. This will preferably be attached to the motor flange. A spring 86 is also mounted to the pivot pin 60 of the lever and to the plow frame for easing the raising and lowering of the same.

The links 64 and 70 are provided with turn buckles for the purpose more particularly of elevating the front plow and initially breaking the ground. These turn buckles enable the adjustment of the discs and the frame.

The upper plow frame is of course adjustable in and out with the plows and the shaft that carries the plows. This adjustment is secured by the adjustment of the front braces on the extension frame.

The front wheels of the tractor run on the unploughed ground enabling the operator to plow better corners.

The spring on the plow shaft absorbs the shocks and jars encountered by the plows in the ground and prevents these shocks and jars being transmitted to the other parts including the tractor and motor.

In order to further brace the front part of the tractor I provide braces 87 and 88.

It is obvious that various changes and modifications may be made in the details of construction and design of the above specifically described embodiment of this invention without departing from the spirit thereof, such changes and modifications being restricted only by the scope of the following claims.

What is claimed is:—

1. In combination, a tractor, agricultural implements at the side thereof, a shaft carrying said implements, means to support the shaft from the tractor at its forward end, and a draft beam pivotally coupled to the rear portion of the shaft and to the rear part of the tractor, said beam extending diagonally of the longitudinal center line of the tractor and crossing said centre line.

2. In combination, a tractor, a shaft carried at the side of said tractor, plows pivotally carried by said shaft, an upper plow frame pivotally supported above said shaft, means for yieldably connecting said plows and said upper plow frame, and means for moving bodily up and down said plows and said upper plow frame.

3. In combination, a tractor, a shaft supported at the side of the tractor, sleeves mounted for independent movement on said shaft, arms extending from the sleeves, plows carried by said arms, an upper plow frame pivoted above said shaft, rods yieldably carried by said upper plow frame and having connection to said plows, and means for raising and lowering the upper plow frame and said plows.

4. In combination, a tractor, a shaft supported at the side of said tractor, sleeves mounted for independent turning movement on said shaft, arms extending from the sleeves, plows carried by said arms, an upper plow frame pivoted above the plows, rods movably mounted on said upper plow frame and having connection to said plows, spring means associated with the rods above and below said upper frame, and means for raising and lowering said upper frame and the plows.

5. In combination, a tractor, a shaft supported at the side of the tractor, plows pivotally hung from said shaft, the upper plow frame pivotally supported from the tractor and above the plows, rods slidingly mounted upon said upper plow frame, one rod being disposed above each of the plows and individually connected with its respective plow, yieldable means associated with the rods above and below said upper plow frame, and means for raising and lowering the plow frame and the plows.

6. In combination, a tractor, plows carried at the side of said tractor, means for raising and lowering said plows, and a furrow guide and gage pivotally supported by said tractor forwardly of the plows and connected to said beams for simultaneous raising and lowering movement with the plows.

7. In combination, a tractor, plows supported for adjustment at the side of the tractor, an upper plow frame yieldably connected with the plows and also movably supported from the tractor, and means for raising and lowering said plow frame and the plows including adjustable connections with the upper plow frame whereby front and rear portions of the frame may be raised and lowered independently of one another.

JOSEPH E. CURTON.